United States Patent
Besuchet

(10) Patent No.: US 12,241,742 B2
(45) Date of Patent: Mar. 4, 2025

(54) NAVIGATION INSTRUMENT WITH TILT COMPENSATION AND ASSOCIATED METHOD

(71) Applicant: ETA SA MANUFACTURE HORLOGÈRE SUISSE, Grenchen (CH)

(72) Inventor: Romain Besuchet, Yverdon-les-Bains (CH)

(73) Assignee: ETA SA MANUFACTURE HORLOGÈRE SUISSE, Grenchen (CH)

( * ) Notice: Subject to any disclaimer, the term of this patent is extended or adjusted under 35 U.S.C. 154(b) by 966 days.

(21) Appl. No.: 17/245,174

(22) Filed: Apr. 30, 2021

(65) Prior Publication Data
US 2021/0397133 A1    Dec. 23, 2021

(30) Foreign Application Priority Data

Jun. 17, 2020 (EP) .................................. 20180573

(51) Int. Cl.
*G01C 17/38* (2006.01)
*G01C 17/28* (2006.01)
*G04B 47/06* (2006.01)

(52) U.S. Cl.
CPC ............. *G01C 17/38* (2013.01); *G01C 17/28* (2013.01); *G04B 47/065* (2013.01)

(58) Field of Classification Search
CPC ........ G01C 17/38; G01C 17/28; G01C 21/12; G01C 21/1654; G04B 47/065
USPC ....................................................... 702/150
See application file for complete search history.

(56) References Cited

U.S. PATENT DOCUMENTS

| 6,836,971 B1* | 1/2005 | Wan ..................... G01C 17/38 33/356 |
| 12,066,289 B2* | 8/2024 | Besuchet ............. G01C 17/38 |
| 2003/0053051 A1* | 3/2003 | Blais ..................... G01R 33/02 356/326 |
| 2004/0187328 A1* | 9/2004 | Satoh .................... G01C 17/28 33/356 |
| 2013/0185018 A1 | 7/2013 | Sheng |
| 2015/0066240 A1* | 3/2015 | Das Adhikary ........ G01C 23/00 701/1 |

(Continued)

FOREIGN PATENT DOCUMENTS

EP    1669718 A1 *   6/2006   ............. G01C 17/30

OTHER PUBLICATIONS

Final Office Action, U.S. Appl. No. 14/735,002, Feb. 2, 2017. (Year: 2017).*
European Search Report of EP 20 18 0573 dated Nov. 12, 2020.

*Primary Examiner* — Michael P Nghiem
(74) *Attorney, Agent, or Firm* — Sughrue Mion, PLLC

(57) ABSTRACT

A navigation instrument including an orientation angle calculation unit, in particular the first and second orientation angles, wherein the orientation angle calculation unit is configured to be able to determine the first and second orientation angles in a given order and also in reverse order; and wherein the calculation unit is arranged to be able to choose between said given order and said reverse order, to calculate the first and second orientation angles, based on a comparison between an indicator of a risk of error, quantifying a risk of instability of said unit during the determination of the first and second orientation angles, and a predetermined threshold.

25 Claims, 6 Drawing Sheets

(56) References Cited

U.S. PATENT DOCUMENTS

| | | | |
|---|---|---|---|
| 2019/0355335 A1* | 11/2019 | Nauer | G10H 1/0066 |
| 2020/0319603 A1* | 10/2020 | Olsen | G04G 21/04 |
| 2021/0396516 A1* | 12/2021 | Besuchet | G01C 21/12 |

* cited by examiner

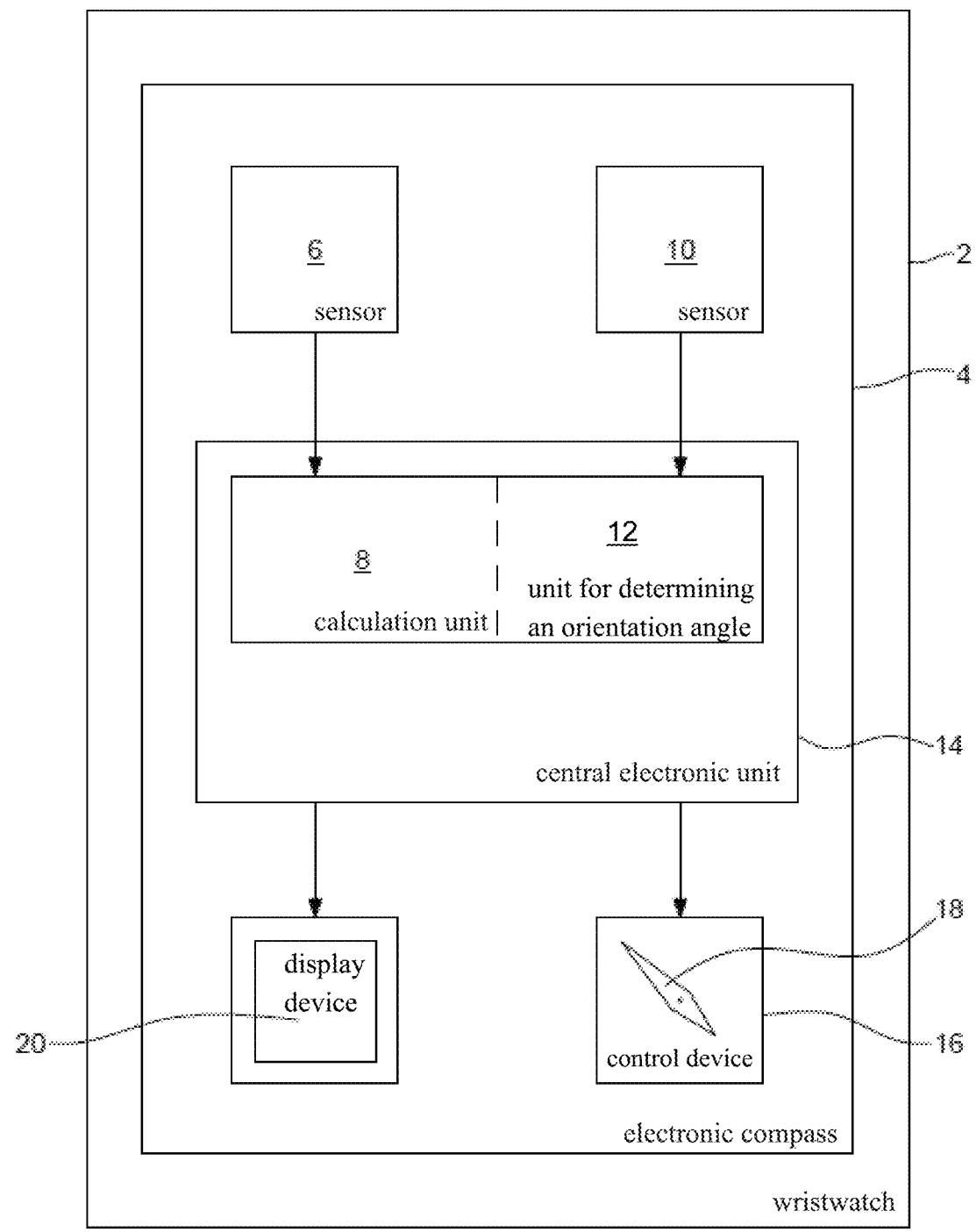

NAVIGATION INSTRUMENT WITH TILT COMPENSATION AND ASSOCIATED METHOD

CROSS REFERENCE TO RELATED APPLICATIONS

This application claims priority to European Patent Application No. 20180573.6, filed on Jun. 17, 2020, the entire contents of which are incorporated herein by reference.

TECHNICAL FIELD

The invention relates to a navigation instrument, in particular an electronic compass, with tilt compensation, a wearable device comprising this instrument, in particular a wristwatch, an associated method allowing to determine orientation angles of the navigation instrument, a program for implementing the method in question and a computer-readable recording medium for this program.

TECHNOLOGICAL BACKGROUND

Electronic compasses these days are primarily wound for tilt compensation. This methodology consists in measuring the terrestrial magnetic field along two or three axes, and firstly compensating for the attitude (roll and pitch) of the compass (acquired by an accelerometer and/or gyroscope) in order to estimate the equivalent heading, as if the compass had been held horizontally, as is advisable in practice. These techniques are generally called "tilt compensation" or 6-DOF, and involve an electronic compass with a measurement of the magnetic field along two axes with a pitch and roll correction.

The objective of these techniques is to be able to estimate the pitch and roll angles of the watch (the yaw being defined by the measurement of the terrestrial magnetic field). Usually, the roll angle is calculated first, and the pitch angle second. The main problem with this method is that when the pitch approaches 90°, there is instability in the calculation of the roll since the projection of the gravity vector on the roll measurement plane has a norm close to zero. The measurement noise of the accelerometer thus generates aberrant results (gimbal lock).

In the particular context of an electronic compass mounted in a watch, in the event that the user does not use his watch horizontally to know the north direction or a heading, there is a good chance that he will apply a strong pitch (generally corresponding to a rotation of the wrist so that he can look at his dial while his corresponding arm is raised) rather than a strong roll (generally corresponding to the angle formed between the forearm and the horizontal) to the watch he wears on his wrist when he observes it. This causes intolerable instability from the point of view of the product.

Solutions exist where some angles are forced at 90° when the norm on the axes of calculation is close to zero and where some solve the gimbal locking problem to freeze a default angle value. This arbitrary choice can lead to erroneous heading values.

SUMMARY OF THE INVENTION

The purpose of the invention is to overcome at least one of the disadvantages of the aforementioned prior art. More particularly, the object of the invention is to reduce the sensitivity to noise of a navigation instrument. To this end, the present invention relates to a navigation instrument comprising:—A first sensor configured to measure three components of a first vector, called first measured vector, of a first terrestrial force field in a reference frame linked to said navigation instrument, called on-board reference frame, and generate first output signals representative of said three components;—An orientation angle calculation unit of the navigation instrument, this calculation unit being connected to said first sensor to receive said first output signals and being configured to be able to calculate a first orientation angle and a second orientation angle of the on-board reference frame, and thus of the navigation instrument, with respect to a terrestrial reference frame, these first and second orientation angles being defined by two successive rotations that the first measured vector must undergo, around a first reference axis of rotation (also called first reference axis) for the first orientation angle and a second reference axis of rotation (also called second reference axis) for the second orientation angle, to align this first measured vector on a calculation vector having, in the on-board reference frame, three calculation components which are identical to three reference components, in the terrestrial reference frame, of a first reference vector which is predefined or predetermined in the terrestrial reference frame. This navigation instrument is remarkable in that the orientation angle calculation unit is configured to be able to determine the first and second orientation angles in a given order of said two successive rotations and also in reverse order; and in that the calculation unit is arranged to be able to choose between said given order and said reverse order, to calculate the first and second orientation angles, based on a comparison between an indicator of a risk of error, quantifying a risk of instability of the calculation unit during the determination of the first and second orientation angles, and a predetermined threshold, said indicator of the risk of error being determined by the navigation instrument according to at least one of said first output signals.

According to advantageous embodiments of the invention, the navigation instrument comprises one or more of the following technical features, in any possible combination:

The indicator of the risk of error is the norm of the projection of the first vector measured in a plane perpendicular to the first reference axis of rotation; and the orientation angle calculation unit is configured to first determine the first orientation angle, by performing among said two successive rotations firstly the rotation of the first vector measured around the first reference axis of rotation, when the indicator of the risk of error is greater than said predetermined threshold.

The value of the predetermined threshold is comprised between 0.15 and 0.45 of the norm of the first measured vector, preferably between 0.20 and 0.30 of this norm.

Alternatively, the indicator of the risk of error is the absolute value of the second orientation angle when the first orientation angle is calculated before the second orientation angle; and the orientation angle calculation unit is configured to again determine the first and second orientation angles by first calculating the second orientation angle, by firstly performing among said two successive rotations the rotation of the first measured vector around the second reference axis of rotation, when the indicator of the risk of error is greater than the predetermined threshold, the calculation unit then retaining the values of the first and second orientation angles determined again for these first and second orientation angles.

In the previous alternative, the value of the predetermined threshold is comprised between 65° and 80°, preferably between 70° and 75°.

A predefined axis of the terrestrial reference frame is aligned with the first reference vector, preferably this first reference vector being aligned with a vertical axis $\vec{1_z}$ of the terrestrial reference frame.

The first reference axis of rotation corresponds to an axis $\vec{1_{x'}}$ in the on-board reference frame and the second reference axis of rotation corresponds to an axis $\vec{1_{y'}}$ in the on-board reference frame, these first and second reference axes of rotation being perpendicular.

The navigation instrument includes a second sensor configured to measure the three components of a second vector, called second measured vector, of a second terrestrial force field in the on-board reference frame, this second measured vector being non-collinear with the first measured vector, and to generate second output signals representative of these three components; the navigation instrument further comprising a unit for determining a third angle of orientation of this instrument relative to the terrestrial reference frame, this determination unit being connected to the second sensor to receive the second output signals and being configured to determine the third orientation angle from the calculated first and second orientation angles and the second measured vector.

The calculation unit and the unit for determining the third orientation angle are formed by a single electronic unit which itself forms a central processing unit.

The third orientation angle is defined by a rotation that the second measured vector must undergo, after having been reoriented in the on-board reference frame by an application to this second measured vector of the first and second successive rotations, around a third reference axis of rotation (also called third reference axis), perpendicular to the first and second reference axes of rotation (and therefore corresponding to an axis $\vec{1_{z'}}$ in the on-board reference frame), so that this second measured and reoriented vector, called second reoriented vector, is located in a first reference plane of the on-board reference frame comprising the first and third reference axes of rotation.

The third orientation angle is determined by first applying to the second measured vector the first and second successive rotations, preferably in the order chosen between said given order and said reverse order to define the first and second orientation angles, so as to obtain the second reoriented vector, then by calculating the angle between a projection, in a second reference plane comprising the first and second reference axes, of the second reoriented vector and the first reference axis.

The third orientation angle is considered as a heading of this instrument.

The first measured vector is a vector of the terrestrial gravitational force field.

The first measured vector is determined by means of an accelerometer forming the first sensor.

The second measured vector is a vector of the terrestrial magnetic field, this second measured vector being determined by means of a magnetic sensor forming the second sensor.

Alternatively, the first measured vector is a vector of the terrestrial magnetic field, the first measured vector being determined by means of a magnetic sensor forming the first sensor.

In the previous alternative, said three reference components are predetermined from data originating from a location device of the navigation instrument, in particular of the GPS type.

In the above-mentioned alternative, the second measured vector is a vector of the terrestrial gravitational force field; the second measured vector being determined by means of an accelerometer which forms the second sensor.

The navigation instrument is an electronic compass which comprises an indicator of magnetic north or geographic north and a device for controlling this indicator, which are arranged to control the indicator so that it has an angle relative to the first reference axis which is equal to the opposite of the third orientation angle, preferably the correction of the deviation of the terrestrial magnetic field at the location of the navigation instrument for the indication of magnetic north and, for the indication of geographic north, in addition to the declination of the terrestrial magnetic field.

The navigation instrument comprises means for displaying data indicating the true heading, said calculation unit being configured to calculate the true heading according to said heading, of a first parameter quantifying the declination of the terrestrial magnetic field and a second parameter quantifying the deviation of the terrestrial magnetic field at the location where the navigation instrument is located.

The invention also relates to a wearable device provided with the navigation instrument. Advantageously, the wearable device according to the invention, in particular a wristwatch, is remarkable in that this device is wearable on the wrist of a user; and in that the first reference axis corresponds to the 6-12 o'clock axis and the second reference axis corresponds to the 9-3 o'clock axis (according to a conventional analogue time display in a watch, the 6-12 o'clock axis being aligned with the longitudinal axis of the watch bracelet).

The invention also relates to a method for determining orientation angles, including at least first and second orientation angles, of a navigation instrument with respect to a terrestrial reference frame, this method comprising the following steps:

acquisition of components of a first vector, called first measured vector, of a first terrestrial force field in a reference frame linked to said navigation instrument, called on-board reference frame;

determination of the first and second orientation angles of the on-board reference frame with respect to the terrestrial reference frame, these first and second orientation angles being defined by two successive rotations of the first measured vector, around a first reference axis of rotation for the first orientation angle and a second reference axis of rotation for the second orientation angle, allowing to align the first measured vector with a calculation vector having, in the on-board reference frame, three calculation components which are identical with three reference components, in the terrestrial reference frame, of a first reference vector which is predefined or predetermined in the terrestrial reference frame;

the determination of the first and second orientation angles comprising a step of choosing between a given order for the two successive rotations and a reverse order; the choice between said given order and said reverse order, to calculate the first and second orientation angles, being based on a comparison between an indicator of a risk of error, quantifying a risk of instability during the determination of the first and second orientation angles, and a predetermined threshold, the indicator of the risk of error being determined based on at least one of said components of the first measured vector.

According to advantageous embodiments of the invention, the method for determining orientation angles comprises one or more of the following features and/or steps, in any possible combination:

The indicator of the risk of error is the norm of the projection of the first vector measured in a plane perpendicular to the first reference axis of rotation, and the first orientation angle is calculated by performing, among said two successive rotations, firstly the rotation of the first vector measured around the first reference axis of rotation when the indicator of the risk of error is greater than said predetermined threshold.

The value of the predetermined threshold is comprised between 0.15 and 0.45 of the norm of the first measured vector, preferably between 0.20 and 0.30 of this norm.

Alternatively, the indicator of the risk of error is the absolute angular value of the second orientation angle when the first orientation angle is calculated, based on said given order, before the second orientation angle, and the second orientation angle is calculated by performing, among said two successive rotations, firstly the rotation of the first vector measured around the second reference axis of rotation when the indicator of the risk of error is greater than said predetermined threshold.

In the previous alternative, the value of the predetermined threshold is comprised between 65° and 80°, preferably between 70° and 75°.

A predefined axis of the terrestrial reference frame is aligned with the first reference vector, preferably this first reference vector being aligned with a vertical axis $\overrightarrow{1_z}$ of the terrestrial reference frame.

The first orientation angle and the second orientation angle are respectively a roll angle and a pitch angle, the roll angle being associated with a rotation around the first reference axis, corresponding to the axis $\overrightarrow{1_{x'}}$ in the on-board reference frame when the roll angle is determined first, and the pitch angle being associated with a rotation around the second reference axis, corresponding to the axis $\overrightarrow{1_{y'}}$ in the on-board reference frame when the pitch angle is determined first.

The method further comprises a step of acquiring three components of a second vector, called second measured vector, of a second terrestrial force field in the on-board reference frame, and a step of determining a third orientation angle from the first and second calculated orientation angles and from the three components of the second measured vector.

The third orientation angle is determined by first applying to the second measured vector said first and second successive rotations, preferably in the order chosen between said given order and said reverse order, to obtain a second measured and reoriented vector, called second reoriented vector, in the on-board reference frame, then by defining the third orientation angle as the angle between a projection of the second reoriented vector, in a reference plane comprising the first and second reference axes, and the first reference axis.

The third orientation angle is a yaw angle of this instrument, this yaw angle being defined by a rotation of the navigation instrument around a third reference axis of rotation, corresponding to a vertical axis $\overrightarrow{1_z}$ in the terrestrial reference frame, after roll and pitch corrections.

The third orientation angle is considered a heading of the navigation instrument.

The first measured vector is a vector of the terrestrial gravitational force field, which is measured using an accelerometer.

The second vector of a second terrestrial force field is a vector of the terrestrial magnetic field, which is measured with a magnetic sensor.

Alternatively, the first measured vector is a vector of the terrestrial magnetic field, the first measured vector being determined by means of a magnetic sensor.

In the previous alternative, the second vector of a second terrestrial force field is a vector of the terrestrial gravitational force field, with the second measured vector being determined by means of an accelerometer.

In the above-mentioned alternative, the three reference components are determined from data coming from a location device of the navigation instrument, in particular of the GPS type.

The navigation instrument is an electronic compass.

The navigation instrument comprises means for displaying data indicating the true heading; and the method further comprises a step of determining the true heading according to said heading determined in one of the preceding steps, of a first parameter quantifying the declination and of a second parameter quantifying the deviation of the terrestrial magnetic field at the location where the navigation instrument is located.

The navigation instrument is configured to be mounted on or integrated into a wearable device.

The wearable device, in particular a wristwatch, is wearable on a user's wrist, the first reference axis corresponding to the 6-12 o'clock axis of a conventional analogue time display by a watch and the second reference axis corresponding to the 9-3 o'clock axis.

The invention also relates to a program comprising instructions which, when the program is executed by a computer, cause this computer to implement the steps of the method according to the invention.

The invention further relates to a computer-readable recording medium comprising instructions which, when executed by a computer, cause the latter to carry out the steps of the method according to the invention.

The measures of the invention are advantageous because, from a mathematical point of view, the approach remains the same regardless of the angle calculated as a priority. However, the result gives a heading which can be very different, depending on whether the two successive rotations are carried out in the given order or in the reverse order, in particular in the case where the two angles are large (typically if the roll and the pitch are equal to 45°). However, it is known that for reasons of comfort, the user will generally use the watch with a roll close to 0° and a pitch which can vary greatly, in particular between −30° and 70°. Under these conditions, the heading measured by this proposition no longer suffers from the gimbal locking effect. Moreover, the method allows to determine the uncertainty associated with a measurement and guarantees digital stability. Finally, the measurements of the invention are more precise than those obtained by the devices or systems in the prior art, since even when the pitch is close to 90°, an estimate of this angle is made. In the prior art, in the same situation, at best a default value is assigned to the pitch.

BRIEF DESCRIPTION OF THE FIGURES

The invention will be described in more detail below using the appended drawings, given by way of non-limiting examples, wherein:

FIG. 8 schematically shows a wearable object of the electronic type incorporating an electronic compass according to the invention.

DETAILED DESCRIPTION OF THE INVENTION

Figure 1:
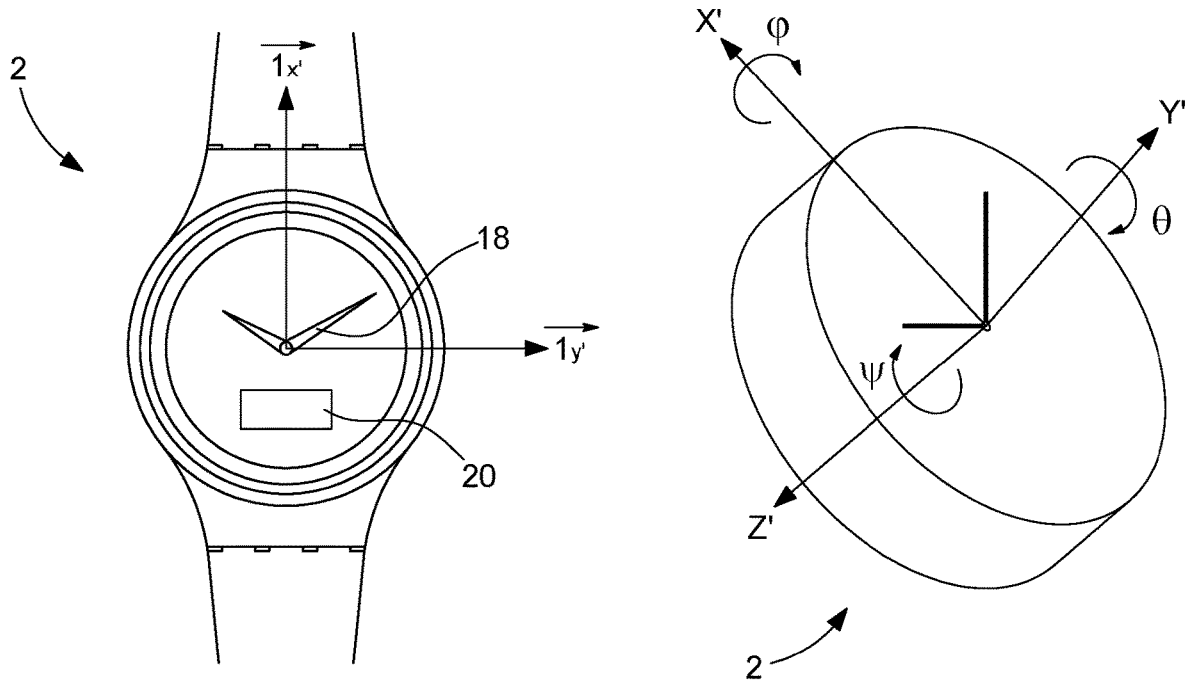
FIG. 1 shows a wristwatch wherein a navigation instrument, in particular an electronic compass is mounted, this FIG. 1 comprising a front view of the wristwatch on the left and a simplified perspective view of this watch on the right.

FIG. 1 shows a first embodiment of the invention wherein the navigation instrument 4 (shown in FIG. 8) is an electronic compass incorporated in a wristwatch 2 which is shown in front view on the left and in perspective view on the right (schematic representation without the bracelet which will be used in the other figures). The navigation instrument comprises a unit 8 for calculating the orientation angles of the wristwatch which is incorporated in or formed by a central electronic unit (see FIG. 8). A reference frame $\vec{1}_{x'}$; $\vec{1}_{y'}$; $\vec{1}_{z'}$ linked to the navigation instrument is shown in FIG. 1. This reference frame is also called on-board reference frame. Even if the on-board reference frame is linked to the navigation instrument, it can be defined with features of the wristwatch 2 wherein the navigation instrument is rigidly fixed. Consequently, advantageously, the on-board reference frame can therefore be defined with the axis $\vec{1}_{x'}$ and the axis $\vec{1}_{y'}$ aligned in direction with the 6 o'clock-12 o'clock axis and the 9 o'clock-3 o'clock axis of the wristwatch 2, defining the general plane of the digital display or analogue display (namely of the main dial) of this wristwatch 2. The axis $\vec{1}_{z'}$ is chosen so as to be perpendicular and preferably dextrorotatory with respect to the axes $\vec{1}_{x'}$ and $\vec{1}_{y'}$ and it is therefore directed towards the bottom of the wristwatch from said general plane of the display.

Figure 2:
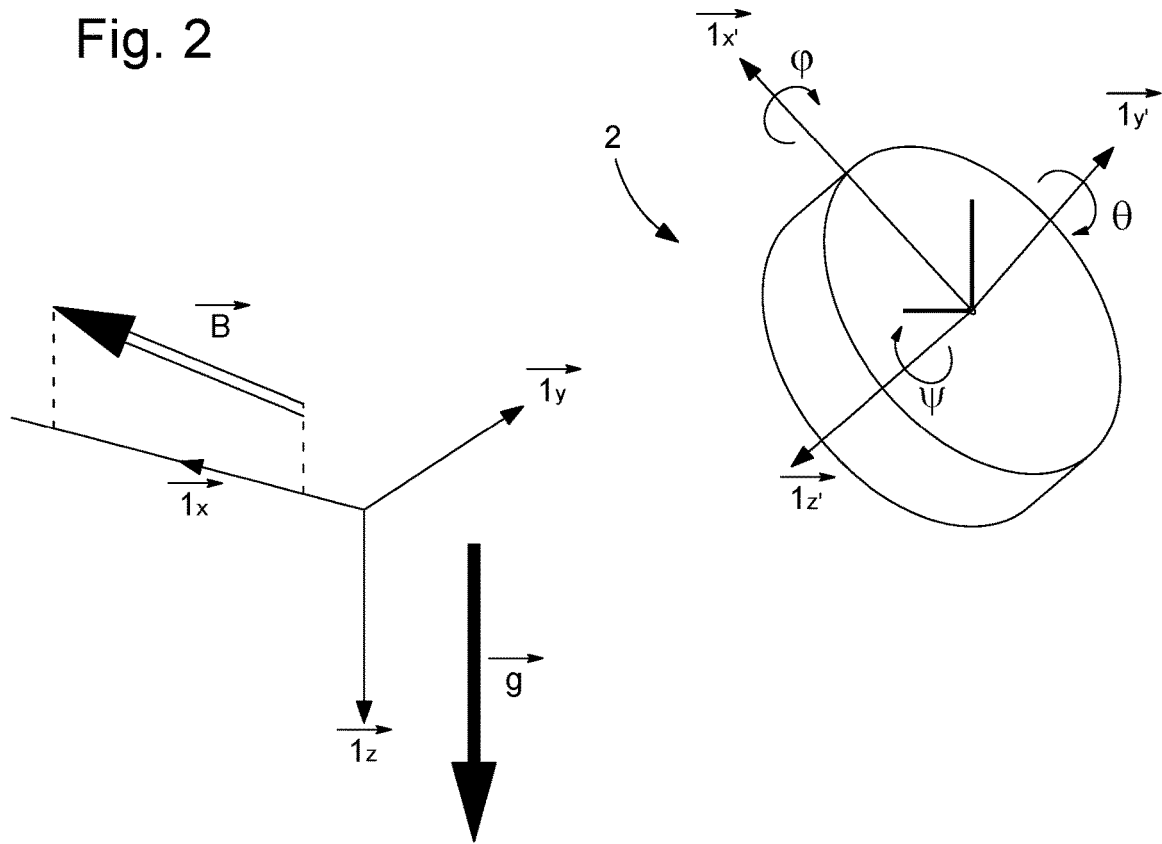
FIG. 2 illustrates an on-board reference frame linked to the wristwatch and a terrestrial reference frame.

The on-board reference frame allows to determine the orientation of the navigation instrument with respect to a predefined terrestrial reference frame as illustrated in FIG. 2. This orientation of the wristwatch 2 can vary significantly when the watch is worn by a user and when the latter changes the position of the wrist on which he wears this wristwatch. Note that the choice of an on-board reference frame $\vec{1}_{x'}$; $\vec{1}_{y'}$; $\vec{1}_{z'}$ just like that of a terrestrial reference frame $\vec{1}_{x}$; $\vec{1}_{y}$; $\vec{1}_{z}$ is arbitrary. This choice is essentially related to conventions of use and/or the intended use of the navigation instrument. For example, the terrestrial reference frame is defined with an axis $\vec{1}_{z}$ oriented in the vertical direction from top to bottom (according to the NED orientation, acronym of North East Down), so that the axis $\vec{1}_{z}$ is aligned in direction with the local gravity field (at the navigation instrument). The local gravity field is characterised by a reference vector of the terrestrial gravitational field, represented by the vector $\vec{g}_{ref}$. The axis $\vec{1}_{x}$ of the reference frame is oriented according to the direction of the magnetic or geographic north pole, as illustrated in FIG. 2. Preferably, the axis $\vec{1}_{x}$ results from the projection of a vector of the reference terrestrial magnetic field in a plane perpendicular to the vector $\vec{g}_{ref}$, the vector of the terrestrial magnetic field pointing towards magnetic north, said vector being represented by the vector $\vec{B}_{ref}$. In most inhabited regions on the surface of the earth, the vector $\vec{B}_{ref}$ is substantially perpendicular to the vector $\vec{g}_{ref}$ and consequently the axis $\vec{1}_{x}$ is substantially collinear with the vector $\vec{B}_{ref}$. The third axis $\vec{1}_{y}$ is defined so as to be perpendicular and dextrorotatory with respect to the axes $\vec{1}_{x}$ and $\vec{1}_{z}$. The definition of the reference frame is not limited to the above example. For example the axis $\vec{1}_{x}$ could have been aligned with the vector $\vec{B}_{ref}$ and the axis $\vec{1}_{z}$ could have been obtained from the projection of the vector $\vec{g}_{ref}$ in a plane perpendicular to the axis $\vec{1}_{x}$. The orientation of the axis $\vec{1}_{z}$ could also have been from bottom to top.

Figure 3:
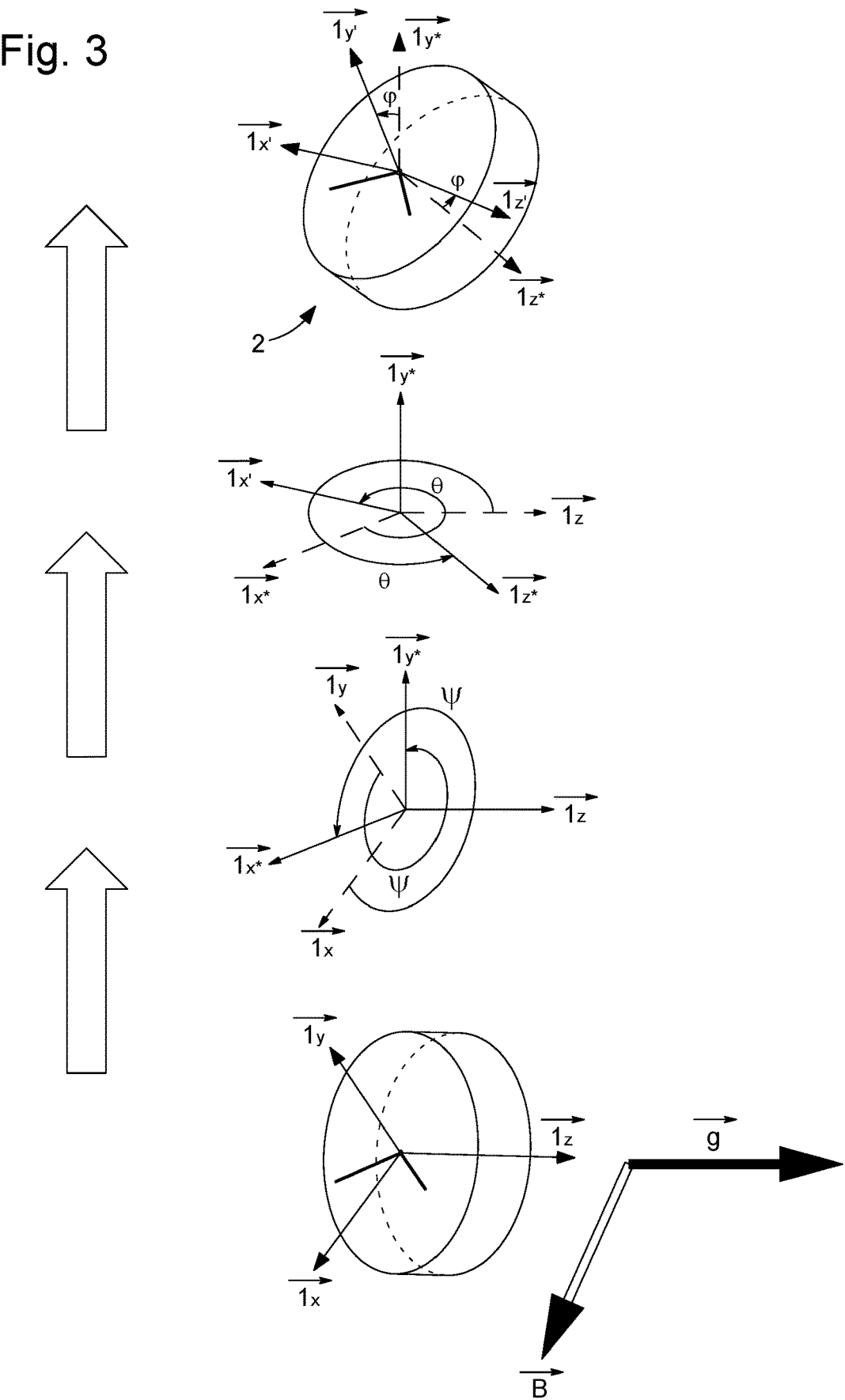
FIG. 3 shows a succession of three rotations that a terrestrial reference frame should undergo so that it coincides with the on-board reference frame of a navigation instrument.

The orientation of the on-board reference frame with respect to the terrestrial reference frame can be defined by a succession of three rotations defined by three orientation angles characterising the movement that the terrestrial reference frame should undergo so that it coincides with the on-board reference frame, as illustrated in FIG. 3.

In a known manner, the orientation of the on-board reference frame relative to the terrestrial reference frame is defined by three reference angles called yaw-pitch-roll. These angles are commonly used especially in aeronautics. The invention is not however limited to this choice of angles because there are other conventions such as Euler angles which are used in other technical fields wherein the present invention is also applicable.

The first rotation called yaw rotation takes place around the axis $\vec{1}_{z}$ with an amplitude ψ. This first rotation allows to determine the amplitude of the yaw movement of the wristwatch 2 (and consequently of the navigation instrument, in particular of the electronic compass). This amplitude also corresponds to the heading of the wristwatch 2 and therefore of the electronic compass. In a particular case where the wristwatch 2 is positioned so that the display plane of the wristwatch 2 is perpendicular to the field $\vec{g}_{ref}$ and therefore to the axis $\vec{1}_{z}$, the yaw rotation directly indicates the heading of the navigation instrument. Indeed, the determination of the heading of the navigation instrument, and therefore of the wristwatch 2, takes place by comparing the orientation of the real wristwatch 2 with respect to a fictitious positioning wherein the 6 o'clock-12 o'clock axis of the wristwatch 2 would be aligned with the axis $\vec{1}_{x}$, implying that the 6 o'clock-12 o'clock axis is wedged with the vector of the terrestrial magnetic field $\overrightarrow{B_{ref}}$. The yaw angle and therefore the heading is determined advantageously from trigonometric calculations on the coordinates of a vector of the measured terrestrial magnetic field $\overrightarrow{B'_{mes}}$. These coordinates are determined by means of a magnetic sensor 10 disposed in the electronic compass 4 (see FIG. 8). The coordinates $B'_{x,mes}$, $B'_{y,mes}$, $B'_{z,mes}$ of the vector of the terrestrial magnetic field $\overrightarrow{B'_{mes}}$ are expressed in the on-board coordinate system/reference frame.

The second rotation, called pitch rotation, takes place around the axis $\overline{1_{y*}}$ of the reference frame obtained after the yaw rotation. The axis $\overline{1_{y*}}$ corresponds to the axis $\overline{1_y}$ of the terrestrial reference frame having undergone the yaw rotation. The pitch amplitude is symbolised by the Greek letter θ. When using a wristwatch 2, the pitch is generally similar to the rotational movement of the forearm that a person makes to look at the time on the display of the wristwatch 2 he is wearing.

The third rotation, called roll rotation, takes place around the axis $\overline{1_{x*}}$, which corresponds to the axis $\overline{1_x}$ in the on-board reference frame. The amplitude of the roll is symbolised by the Greek letter ϕ. When using a wristwatch 2, the roll is generally similar to the rotational movement of the forearm relative to the horizontal.

The determination of the two roll and pitch angles can be carried out by comparing the position of the wristwatch 2 worn by the user with a virtual position wherein the plane of the display of the wristwatch 2 would be flat (that is to say horizontal) and therefore perpendicular to the vertical axis $\overline{1_z}$. To determine these two angles, the electronic compass includes a sensor 6 (see FIG. 8) which allows to measure the vector of the terrestrial gravitational field in the on-board coordinate system (linked to the watch), represented by $\overrightarrow{g'_{mes}}$. On the basis of the measurement of the components $g'_{x,mes}$, $g'_{y,mes}$, $g'_{z,mes}$ of the vector $\overrightarrow{g'_{mes}}$ in the on-board reference frame of the wristwatch 2 to which the magnetic compass 4 is rigidly fixed, the pitch and roll angles can easily be deduced from trigonometric calculations, as explained below.

With the knowledge of the amplitudes of the three rotations described above it is possible, as illustrated in FIG. 3, to bring a wristwatch 2 in a virtual manner for example from an initial virtual position wherein it occupies a reference position in the terrestrial reference frame to a final real position, when it is carried by the user. In the initial virtual position, the 6 o'clock-12 o'clock axis of the wristwatch 2 is aligned with the axis $\overline{1_x}$ and the general plane of the display (formed by the 6 o'clock-12 o'clock axis and the 9 o'clock-3 o'clock axis) is perpendicular to the vertical axis $\overline{1_z}$. As indicated previously, the yaw angle determined during the first rotation allows to determine the heading of the wristwatch 2. The second and third rotation angles allow to determine the pitch angle and the roll angle of the wristwatch.

The on-board reference frame relative to the terrestrial reference frame can therefore be defined by a transformation of reference frame to describe a "solid" movement, wherein the 3 orientation angles, namely yaw, pitch and roll, together define the angular displacements of the terrestrial reference frame axes ($\overline{1_x}$; $\overline{1_y}$; $\overline{1_z}$) so as to make them coincide with the corresponding axes of the on-board reference frame ($\overline{1_{x'}}$; $\overline{1_{y'}}$; $\overline{1_{z'}}$). This reference frame transformation corresponds, for a point (x, y, z) in the terrestrial reference frame, to a change of coordinates which is expressed by the matrix product given in equation 1 below, this equation 1 providing the coordinates (x', y', z') from this point in the on-board reference frame.

$$\begin{pmatrix} x' \\ y' \\ z' \end{pmatrix} = R_\varphi^{-1} \cdot R_\theta^{-1} \cdot R_\psi^{-1} \begin{pmatrix} x \\ y \\ z \end{pmatrix} \text{ with} \quad \text{Equation 1}$$

$$R_\varphi = \begin{pmatrix} 1 & 0 & 0 \\ 0 & \cos\varphi & -\sin\varphi \\ 0 & \sin\varphi & \cos\varphi \end{pmatrix} \text{ and } R_\varphi^{-1} = R_\varphi^T$$

$$R_\theta = \begin{pmatrix} \cos\theta & 0 & \sin\theta \\ 0 & 1 & 0 \\ -\sin\theta & 0 & \cos\theta \end{pmatrix} \text{ and } R_\theta^{-1} = R_\theta^T$$

$$R_\psi = \begin{pmatrix} \cos\psi & -\sin\psi & 0 \\ \sin\psi & \cos\psi & 0 \\ 0 & 0 & 1 \end{pmatrix} \text{ and } R_\psi^{-1} = R_\psi^T$$

where $R_\varphi^T$, $R_\theta^T$, $R_{104}^T$ are the transposed matrices of $R_\varphi$, $R_\theta$ and $R_\psi$.

As the electronic compass is incorporated in the wristwatch and that, for this electronic compass, only the on-board reference frame is initially defined and known, and as the planned method consists in bringing the on-board reference frame virtually to coincide with the terrestrial reference frame to determine the orientation angles of the wearable device that is the wristwatch, in particular a heading of this wearable device, attention is then paid to the transformation of reference frame reverse to that described above. Starting from a vector or more vectors having coordinates (x', y', z') in the on-board reference frame (the vectors having their origin at point (0, 0, 0) in the on-board reference frame and also in the terrestrial reference frame), it is sought to determine the coordinates (x, y, z) of this or these vector(s) in the terrestrial reference frame. On the basis of equation 1 given previously, the mathematical relationship, in matrix form, between a vector (x', y', z') expressed in the on-board reference frame and this same vector (x, y, z) expressed in the terrestrial reference frame is given by equation 2 below. This property will be exploited in the remainder of the description of the invention for the calculation of the angles of orientation of the wearable device incorporating the electronic compass. The matrix relation of equation 2 defines a passage matrix allowing, for a point or a vector, to switch from the on-board reference frame to the terrestrial reference frame (that is to say for the expression of its coordinates).

$$\begin{pmatrix} x \\ y \\ z \end{pmatrix} = R_\psi \cdot R_\theta \cdot R_\varphi \begin{pmatrix} x' \\ y' \\ z' \end{pmatrix} \quad \text{Equation 2}$$

Given that the coordinates of a point can define the end of a vector whose origin coincides with the common origin of the on-board and terrestrial reference frames, as indicated previously, equation 2 thus allows to establish a relation between the measured vector $\overrightarrow{g'_{mes}}$ defined in the on-board reference frame and the same vector $\overrightarrow{g_{mes}}$ defined in the terrestrial reference frame. This relation is as follows:

$$\begin{pmatrix} g_{x,mes} \\ g_{y,mes} \\ g_{z,mes} \end{pmatrix} = R_\psi \cdot R_\theta \cdot R_\varphi \begin{pmatrix} g'_{x,mes} \\ g'_{y,mes} \\ g'_{z,mes} \end{pmatrix} \quad \text{Equation 3}$$

Also, the relation between the measured vector $\overrightarrow{B'_{mes}}$ defined in the on-board reference frame and the same vector $\overrightarrow{B_{ref}}$ defined in the terrestrial reference frame is as follows:

$$\begin{pmatrix} B_{x,mes} \\ B_{y,mes} \\ B_{z,mes} \end{pmatrix} = R_\psi \cdot R_\theta \cdot R_\varphi \begin{pmatrix} B'_{x,mes} \\ B'_{y,mes} \\ B'_{z,mes} \end{pmatrix} \quad \text{Equation 4}$$

However, the calculation of the angles of orientation starts from the assumption that the measured vectors $\overrightarrow{g'_{mes}}$, $\overrightarrow{B'_{mes}}$ in the on-board reference frame are collinear with reference vectors $\overrightarrow{g_{ref}}$, $\overrightarrow{B_{ref}}$ which correspond to them and whose components in the terrestrial reference frame are predefined or predetermined. Thanks to equations 3 and 4, it is possible to determine the components of each of the measured vectors $\overrightarrow{g'_{mes}}$, $\overrightarrow{B'_{mes}}$ in the terrestrial reference frame, as follows:

Equations 5a and 5b $$\begin{pmatrix} g_{x,ref} \\ g_{x,ref} \\ g_{z,ref} \end{pmatrix} = k1 \cdot \begin{pmatrix} g_{x,mes} \\ g_{x,mes} \\ g_{z,mes} \end{pmatrix} = k1 \cdot R_\psi \cdot R_\theta \cdot R_\varphi \begin{pmatrix} g'_{x,mes} \\ g'_{y,mes} \\ g'_{z,mes} \end{pmatrix}$$

$$\begin{pmatrix} B_{x,ref} \\ B_{x,ref} \\ B_{z,ref} \end{pmatrix} = k2 \cdot \begin{pmatrix} B_{x,mes} \\ B_{x,mes} \\ B_{z,mes} \end{pmatrix} = k2 \cdot R_\psi \cdot R_\theta \cdot R_\varphi \begin{pmatrix} B'_{x,mes} \\ B'_{y,mes} \\ B'_{z,mes} \end{pmatrix}$$

It is therefore possible to calculate the angles of orientation by solving equations 5a and 5b. However, this approach to finding the angles of orientation is far from being advantageous in all circumstances, as there may be singular solutions (for example gimbal lock). For this reason, according to the invention, a more sophisticated approach has been developed, as discussed below.

In the case of switching from the on-board reference frame (that of the measurement) to the terrestrial reference frame (that of the reference vectors whose expression is at least partially known in this terrestrial reference frame) for a point or a measured vector, it is observed in equation 2 that the succession of the reference rotations is: first the roll (angle φ), then the pitch (angle θ) and finally the yaw (angle ψ). Preferably, the roll and pitch angles are determined, in a first step, on the basis of the measurement of a vector of the gravitational field $\overrightarrow{g'_{mes}}$ (having a norm g), this first step being followed by the determination of the yaw and therefore the heading during a second step, the calculation of the yaw being based on the measurement of a vector of the terrestrial magnetic field $\overrightarrow{B'_{mes}}$.

The first step therefore consists in determining the roll and pitch angles from equation 5a. The choice of an appropriate terrestrial reference frame with a vector of the gravitational field aligned with the vertical axis $\overline{1_z}$ allows to simplify the calculations and better anticipate a risk of dial lock, as shown in the equations below.

$$\overrightarrow{g_{ref}} = k \cdot R_\psi \cdot R_\theta \cdot R_\varphi \cdot \overrightarrow{g_{mes'}}$$

according to equation 5a with $$\overrightarrow{g_{ref}} = \begin{pmatrix} 0 \\ 0 \\ g_{z,ref} \end{pmatrix} = \begin{pmatrix} 0 \\ 0 \\ g_z \end{pmatrix} \text{ and } \overrightarrow{g_{mes'}} = \begin{pmatrix} g_{x,mes} \\ g_{x,mes} \\ g_{z,mes} \end{pmatrix} = \begin{pmatrix} g'_x \\ g'_y \\ g'_z \end{pmatrix}$$

Equation 5a can be rewritten and simplified as follows:

$$R_\psi^{-1} \cdot \overrightarrow{g_{ref}} = R_\psi^T \cdot \overrightarrow{g_{ref}} = \overrightarrow{g_{ref}} = k \cdot R_\theta \cdot R_\varphi \overrightarrow{g_{mes'}}$$

And thus:

$$\begin{pmatrix} \cos\psi & \sin\psi & 0 \\ -\sin\psi & \cos\psi & 0 \\ 0 & 0 & 1 \end{pmatrix} \cdot \begin{pmatrix} 0 \\ 0 \\ g_z \end{pmatrix} =$$

$$\begin{pmatrix} 0 \\ 0 \\ g_z \end{pmatrix} = k \cdot \begin{pmatrix} \cos\theta & 0 & \sin\theta \\ 0 & 1 & 0 \\ -\sin\theta & 0 & \cos\theta \end{pmatrix} \cdot \begin{pmatrix} 1 & 0 & 0 \\ 0 & \cos\varphi & -\sin\varphi \\ 0 & \sin\varphi & \cos\varphi \end{pmatrix} \begin{pmatrix} g'_x \\ g'_y \\ g'_z \end{pmatrix}$$

The roll angle resulting from equation 5a, in the case of a first measured vector which is collinear with a first vertical reference vector, is given by the following trigonometric relation:

$$\varphi = \arctan(g'_y/g'_z) \quad \text{Equation 6}$$

The pitch angle is then given by:

$$\theta = -\arctan(g'_x/g^*_z) \quad \text{Equation 7}$$

with $$g^*_z = g'_y \cdot \sin\psi + g'_z \cdot \cos\varphi$$

Figure 4A:
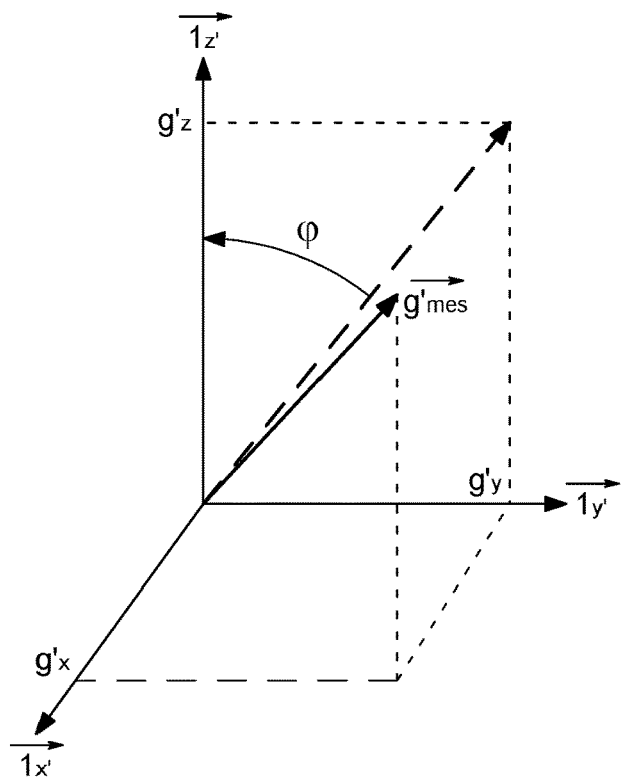
FIG. 4a illustrates a projection of a vector of the terrestrial gravitational field in a plane perpendicular to the axis $\vec{1}_{x'}$ of the on-board reference frame, defining a roll angle.

Advantageously, it follows from equation 6 that the roll angle φ corresponds to the angle between the projection of the terrestrial gravitational field vector $\overrightarrow{g_{mes'}}$ in the reference plane Y'-Z' (perpendicular to the axis $\overline{1_{x'}}$) and the axis $\overline{1_{z'}}$, as illustrated in FIG. 4a.

Figure 4B:
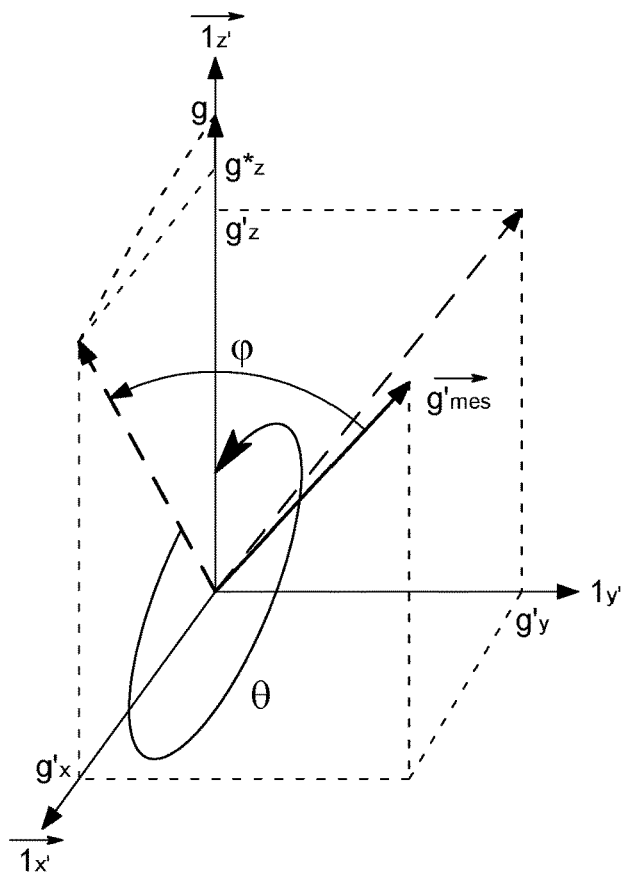
FIG. 4b shows a first rotation and a second rotation of the vector of the terrestrial gravitational field so as to make it coincide with a calculation vector whose components are proportional to those of the terrestrial gravitational field in the terrestrial reference frame.

Then, it follows from equation 7 that the pitch angle θ corresponds to the angle between a work vector, resulting from the rotation of the terrestrial gravitational field vector $\overrightarrow{g_{mes'}}$ in the reference plane X'-Z' (perpendicular to the axis $\overline{1_{y'}}$) and the axis $\overline{1_{z'}}$, as illustrated in FIG. 4b.

FIG. 4b illustrates that the roll and pitch angles are defined by two successive rotations that the measured terrestrial gravitational force field vector $\overrightarrow{g'_{mes}}$ should undergo, around first the axis $\overline{1_{x'}}$ for the roll rotation and then around the axis $\overline{1_{y'}}$ for the pitch rotation, to align this measured vector on the axis $\overline{1_{z'}}$.

Figure 5:
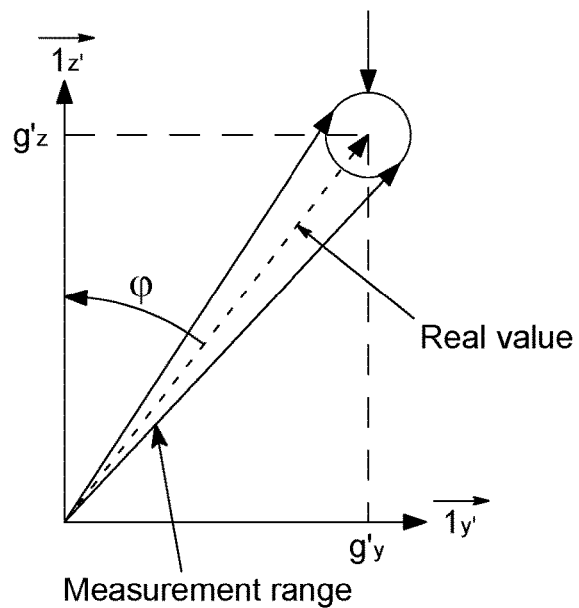
FIG. 5 comprises two graphs illustrating the effect of the measurement noise on the calculation of the roll angle.
Figure 5:
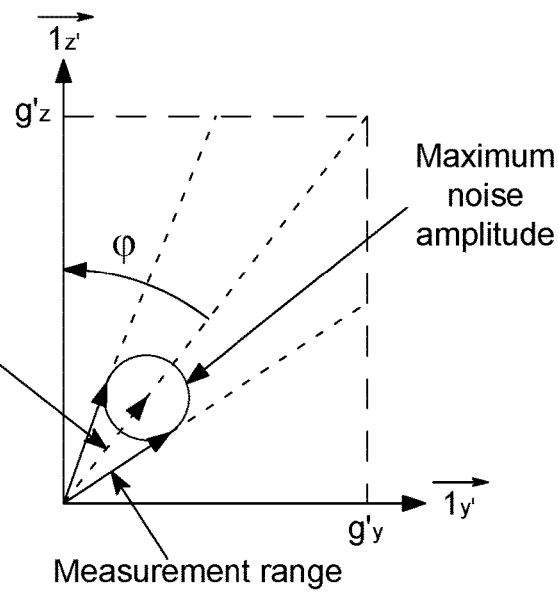

The vector of the gravitational field measured in the on-board coordinate system $\overrightarrow{g'_{ref}}$ can be determined by an accelerometer which provides output signals representative of the three components of this vector. However, it has been observed that the three signals corresponding to the three components each have noise, the amplitude of which is not negligible and can greatly disturb the measurement of the angles of orientation if no suitable measures are taken. Note that, for each of the three components of the measured vector, the noise is a random effect that does not depend on the amplitude of the measurement signal. Noise is therefore problematic when calculating the attitude of the wearable device. Indeed, the calculation of the roll angle is done on a projection, and therefore potentially on a low amplitude vector. As the noise is statistically invariant on each measurement axis, the measurement uncertainty increases when the amplitude of the measured and projected vector decreases. In the example shown in FIG. 5 where the roll rotation is performed before the pitch rotation, it is observed in the plane Y'-Z' (defined by the axes/vectors $\overline{1_{y'}}$ and $\overline{1_{z'}}$ of the on-board reference frame) that the noise generates a much larger roll angle error when the norm is low (see the image on the right relative to the image on the left).

Mathematically, the problems appear when one approaches a case of gimbal lock which occurs when the axis of rotation of the roll becomes substantially collinear with the axis of rotation of the pitch. Note that the roll value has a direct impact on the calculated yaw value. It is seen that if the calculated roll value is unstable, the yaw value and therefore the heading indicated by a hand or other display will also be unstable.

According to the invention, the order of the calculation of the orientation angles can be reversed in order to avoid this instability which appears when the projection of the vector measured in the plane Y'-Z' is too small. Thanks to this measurement, the norm of the projection of the measured vector $\overrightarrow{g'_{mes}}$ in the plane X'-Z' (defined by the axes/vectors $\overrightarrow{1_{x'}}$ and $\overrightarrow{1_{z'}}$ of the on-board reference frame), used to calculate the pitch angle θ, then remains within an acceptable range. This phenomenon is explained because, as the acceleration is of constant norm, if its projection is of low norm in one plane, it is necessarily large in the other perpendicular planes.

The order of calculation of the roll and pitch angles is therefore either in a given order or in a reverse order. The given order involves first a roll rotation followed by a pitch rotation. For the reverse order, an inversion of the given order is provided with a pitch rotation which is calculated first and then a roll rotation. It will also be noted that these rotations applied to a vector measured in the on-board reference frame correspond to a correction of the roll and of the pitch involved in the wearable device incorporating or provided with the electronic compass according to the invention and therefore to rotations in the opposite direction (−φ; −θ) of the on-board reference frame, so that this on-board reference frame is virtually reoriented with its axis $\overrightarrow{1_{z'}}$ collinear with the vertical axis/vector $\overrightarrow{1_z}$ of the terrestrial reference frame.

For the order given above, the roll and pitch angles are determined by equations 6 and 7 given above. For the reverse order, the simplified equation 5a is replaced by the following equation 5c:

$$R_\psi^{-1} \cdot \overrightarrow{g_{ref}} = R_\psi^T \cdot \overrightarrow{g_{ref}} = \overrightarrow{g_{ref}} = k \cdot R_\psi \cdot R_\theta \cdot \overrightarrow{g_{mes'}}$$

The pitch angle resulting from the equation 5c, in the case of a first measured vector which is collinear with a first vertical reference vector, is given by the following trigonometric relation:

$$\theta = -\arctan(g'_x/g'_z) \qquad \text{Equation 8}$$

The roll angle is then given by:

$$\varphi = \arctan\left(\frac{g'_y}{-g'_x \cdot \sin\theta + g'_z \cdot \cos\theta}\right) \qquad \text{Equation 9}$$

Note that, in general, $R_\psi \cdot R_\theta$ is not equal to $R_\theta \cdot R_\psi$, so that the inversion of the two successive considered rotations has an influence on the yaw value calculated subsequently to obtain a heading of the wristwatch 2. This will be discussed later.

The choice of the order in which the roll and pitch angles are calculated can be based on various criteria. For example, a first criterion exploits the norm (or the square of the norm) of the projection of the vector $\overrightarrow{g'_{mes}}$ in the plane Y'-Z'. If this norm is less than a given value, the order of calculating the angles is reversed (calculating the pitch first, then the roll). Alternatively, a second proposed criterion concerns the value of the pitch angle when this value is determined according to the given order (calculating the roll first, then the pitch). If the pitch turns out to be greater than a given angle, the calculation of the two angles considered here is performed a second time with the pitch being calculated first.

Figure 6:
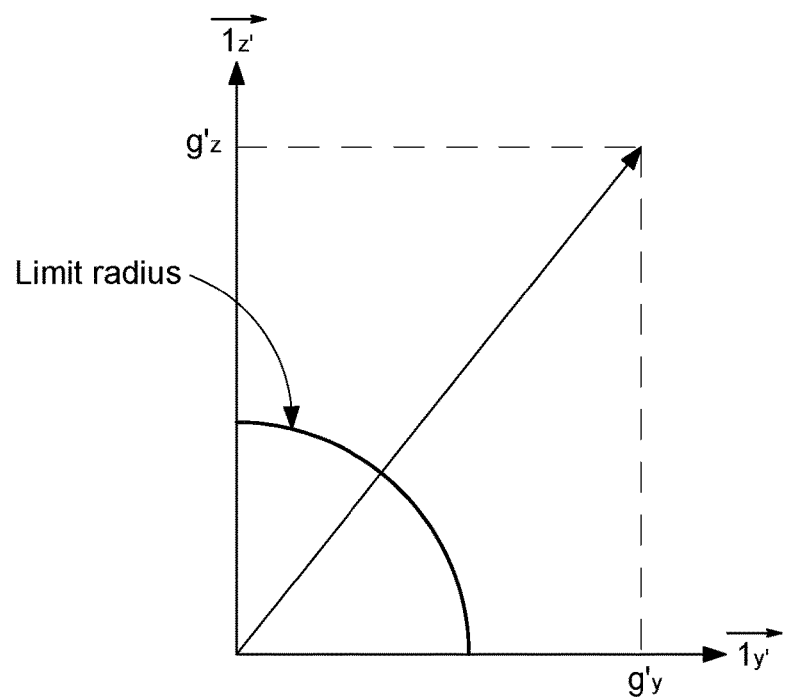
FIG. 6 shows an area of arbitration between the given order and the reverse order for two successive rotations relating to the roll and pitch of the navigation instrument.

The first criterion, known as the basic criterion, aims at ensuring that the limit of the norm projected on the plane Y'-Z' (defined by the axes $\overrightarrow{1_{y'}}$ and $\overrightarrow{1_{z'}}$ of the on-board reference frame) is much larger than the maximum noise norm. In this way, a certain precision is ensured for the calculation of the roll angle. Advantageously, this condition can be carried out by comparing the projection of the measured vector $\overrightarrow{g'_{mes}}$ in the plane Y'-Z' and a predetermined threshold value (limit radius as illustrated in FIG. 6). A condition for switching into pitch first would be that the projection of the projected vector $\overrightarrow{g'_{mes}}$ has a norm less than a given threshold value. For example, the value of the predetermined threshold is comprised between 0.15 and 0.45 of the norm of the measured vector $\overrightarrow{g'_{mes}}$, preferably between 0.20 and 0.30 of this norm. These values are particularly favourable for a navigation instrument mounted on or in a wristwatch. Indeed, it turns out that the user tends to look at his watch with his forearm positioned horizontally, with a wrist turned approximately 30° to 60° in pitch. Thus, in an advantageous embodiment of the invention, the choice to use the reverse order occurs when the pitch exceeds a threshold value comprised between 70° and 75° (see alternative criterion). Indeed, it is advantageous to prevent the order from being reversed within a useful range of 30° to 60° for the pitch when the user looks at his watch, hence the choice of an angle of the above-mentioned threshold value.

Other ranges of values can be chosen for the threshold value depending on the field of application of the navigation instrument, for example a range centred around cos (45°), that is to say 0.707. This selection allows to optimise the reduction in the influence of the measurement noise for the calculated values, but it risks creating instability in the display of the heading for an electronic compass incorporated in an object wearable on the wrist, and possibly more repetitions of the sequence for calculating the roll and pitch angles due to this instability. Indeed, as the given order and the reverse order for the roll and pitch rotations applied to the measured vector $\overrightarrow{g'_{mes}}$ leads to a different yaw/heading value, if the pitch angle varies around the threshold value during use of the electronic compass, the indicated heading will be, without other measurements, recalculated at each change in the result of the comparison defined by the criterion for the choice of the order of the two rotations in question. The second criterion, called alternative criterion, is substantially equivalent to the first criterion. It is based on the comparison between the pitch angle calculated according to the given order and a threshold value comprised between 65° and 80°, preferably between 70° and 75°.

The approach proposed by the invention is in particular based on the observation that, despite and regardless of the noise, it is always possible to bring the gravitational vector measured on the axis $\overrightarrow{1_{z'}}$ with relatively good precision in determining the roll and pitch angles. Indeed, despite the noise in the measurement of the gravitational vector, the calculation of the roll of a measured vector coplanar with the plane Y'-Z' (defined by the vectors $\overrightarrow{1_{y'}}$ and $\overrightarrow{1_{z'}}$) is always relatively precise and the calculation of the pitch of a measured vector coplanar to the plane X'-Z' (defined by the vectors $\overrightarrow{1_{x'}}$ and $\overrightarrow{1_{z'}}$) is always relatively precise. Then, after the roll is calculated first and the corresponding rotation applied to the measured vector, the measured vector thus reoriented is in the plane X'-Z' so that the pitch can then be calculated with good precision. Likewise, once the pitch is calculated first and the corresponding rotation applied to the measured vector, the measured vector thus reoriented is in the plane Y'-Z' so that the roll can then be calculated with good precision. It is therefore understood that it is the first calculation of an orientation angle of the electronic compass which is critical since it is based on a projection in a reference plane and that the norm of this projection can be relatively small, so that the noise occurring during the measurement can strongly distort the result of the first angle calculated subsequently by the calculation unit 8 of the electronic compass 4, as explained previously. Thanks to the invention, good precision or sufficient precision for this first calculation is ensured by selecting between 'roll first' and 'pitch first'.

The second step consists in determining the yaw to obtain the heading. This step consists in solving the equation 5b given previously. The choice of a judicious terrestrial reference frame allows to simplify the calculation steps, in particular when the projection of the reference terrestrial magnetic field vector $\overrightarrow{B_{ref}}$, corresponding to a second reference vector, in a plane perpendicular to the axis $\overrightarrow{1_z}$ is collinear with the axis $\overrightarrow{1_x}$; which is the case for the terrestrial reference frame NED defined at the start. In this case the following equation is obtained for the magnetic vector measured by the magnetic sensor:

$$\begin{pmatrix} B_{x,ref} \\ B_{y,ref} \\ B_{z,ref} \end{pmatrix} = \begin{pmatrix} B_{x,ref} \\ 0 \\ B_{z,ref} \end{pmatrix} = k2 \cdot \begin{pmatrix} B'_{x,mes} \\ B'_{y,mes} \\ B'_{z,mes} \end{pmatrix} = k2 \cdot R_\psi \cdot R_\theta \cdot R_\varphi \begin{pmatrix} B'_{x,mes} \\ B'_{y,mes} \\ B'_{z,mes} \end{pmatrix} \quad \text{Equation 10a}$$

Equation 10a corresponds to the 'roll first' alternative and for the 'pitch first' case there is an equation 10b similar to equation 10a but with an inversion of the rotation matrices $R_\psi$ and $R_\theta$. The yaw angle ψ can be determined by first applying to the vector of the measured terrestrial magnetic field $\overrightarrow{B'_{mes}}$, in the on-board frame, two successive rotations corresponding to a roll rotation and a pitch rotation according to an order chosen between said given order and said reverse order, as explained previously, so as to obtain a measured and reoriented vector of the terrestrial magnetic field $\overrightarrow{B *_{mes}}$, then by calculating the angle between a projection, in the reference plane X'-Y' defined by the axis $\overrightarrow{1_x}$, and the axis $\overrightarrow{1_{y'}}$, of the vector of the reoriented terrestrial magnetic field $\overrightarrow{B *_{mes}}$ and the axis $\overrightarrow{1_{x'}}$. Starting from equations 10a and 10b, the following simplified equation is obtained:

$$\begin{pmatrix} B_{x,ref} \\ 0 \\ B_{z,ref} \end{pmatrix} = k2 \cdot R_\psi \begin{pmatrix} B^*_{x,mes} \\ B^*_{y,mes} \\ B^*_{z,mes} \end{pmatrix}$$

with
in the given order:

$$\begin{pmatrix} B^*_{x,mes} \\ B^*_{y,mes} \\ B^*_{z,mes} \end{pmatrix} = R_\theta \cdot R_\varphi \begin{pmatrix} B'_{x,mes} \\ B'_{y,mes} \\ B'_{z,mes} \end{pmatrix} \quad \text{Equation 11a}$$

in the reverse order:

$$\begin{pmatrix} B^*_{x,mes} \\ B^*_{y,mes} \\ B^*_{z,mes} \end{pmatrix} = R_\varphi \cdot R_\theta \begin{pmatrix} B'_{x,mes} \\ B'_{y,mes} \\ B'_{z,mes} \end{pmatrix} \quad \text{Equation 11b}$$

From equation 10a or 10b, the yaw/heading angle is therefore given by the following equation:

$$\psi = -\arctan(B^*_{y,mes}/B^*_{x,mes}) \quad \text{tm Equation 12}$$

All the calculation steps described above can be carried out by the central processing unit 14 of the electronic compass 4. The determination of the heading is based on the yaw angle calculated with the equation 12 by a unit 12 for determining a heading, which can be formed by the same electronic circuit as the unit 8 for calculating the roll and pitch angles. In a variant, the electronic compass comprises a magnetic north or geographic north indicator 18 and a device 16 for controlling this indicator (see FIG. 1 and FIG. 8). The control device 16 may be arranged to control the indicator 18 so that it has an angle relative to the axis $\overrightarrow{1_x}$ equal to the opposite of the yaw angle, preferably the correction of the deviation of the terrestrial magnetic field at the location of the navigation instrument for the indication of the magnetic north and, for the indication of the geographic north, in addition to the declination of the terrestrial magnetic field.

The electronic compass 4 preferably comprises a device 20 for displaying data indicating the true heading (see FIG. 1 and FIG. 8), the unit 12 for determining a heading being configured to calculate the true heading based on the heading provided by the equation 12 given above, a first parameter quantifying the declination of the terrestrial magnetic field and a second parameter quantifying the deviation of the terrestrial magnetic field at the location where the navigation instrument is located. In particular, for determining the declination and deviation of the terrestrial magnetic field, the wearable object 2 further comprises a geolocation device. The electronic compass 4 may have a non-volatile memory wherein are stored information relating to the declination and the deviation and/or a program provided for determining them in particular on the basis of geolocation. In addition, the wearable object can have wireless communication means allowing in particular to acquire at the declination and the deviation of the magnetic field depending on the location where the wearable object incorporating the electronic compass is located.

Figure 7A:
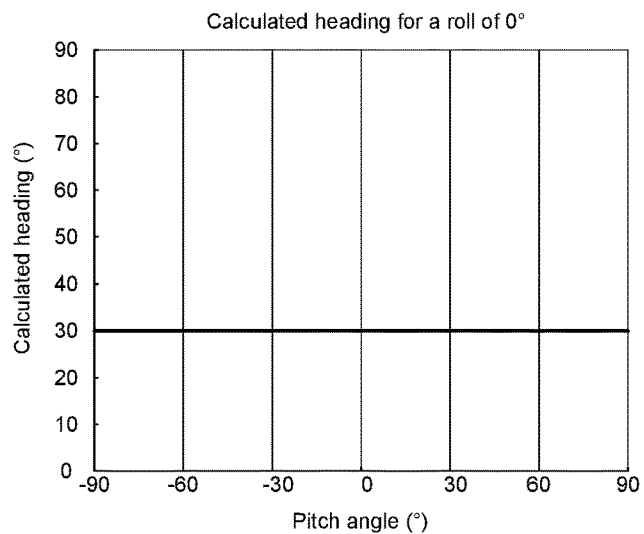
FIGS. 7a to 7c show a series of graphs comparing the heading values to the pitch value for various given roll angles with the given order and the reverse order for the two roll and pitch rotations.

A comparative study was carried out to demonstrate that the choice of the order of rotation between the given order (roll then pitch) or the reverse order (pitch then roll) has relatively little importance on the result of the calculation of the yaw angle, and therefore of the heading, in the context of the application of a wristwatch 2. Indeed, the order of the roll and pitch rotations normally influences the calculation of the roll angle and the pitch angle because, as already indicated, the product of matrices is not commutative ($R_\theta \cdot R_\varphi \neq R_\varphi \cdot R_\theta$). FIG. 7a shows that in the absence of roll (the forearm wearing the wristwatch provided with the electronic compass being horizontal), the permutation between the given and reverse order has no impact. This finding is important because it turns out that a user tends to look at his watch on his wrist with his forearm positioned substantially horizontal, with a wrist turned in particular 30° to 60° in pitch. Thus, in an advantageous embodiment of the invention, the choice to use the reverse order occurs when the pitch exceeds 70°, but one could also choose another threshold value, for example 60°. Indeed, it is advantageous, as already explained, to prevent the order from being reversed in a usual pitch range in order to avoid instability in the succession of sequences for calculating the angles of orientation and/or an increase in the number of these calculation sequences, hence the (arbitrary) choice of an angle greater than 60°, in particular 70°. As long as the roll remains low, which is practically the case in general, even when operating above this value, the user of the watch will not notice any difference when switching from the given order to the reverse order (FIG. 7a). As a reminder, this inversion allows to reduce the influence of the measurement noise on the determination of the orientation angles of the navigation instrument (in particular of an electronic compass), to increase the precision of the heading measurement and also to reduce any possible instability of the successive results given by a succession of calculation sequences, such instability resulting in an oscillation of the hand indicating the north and/or of the heading value displayed.

Figure 7B:
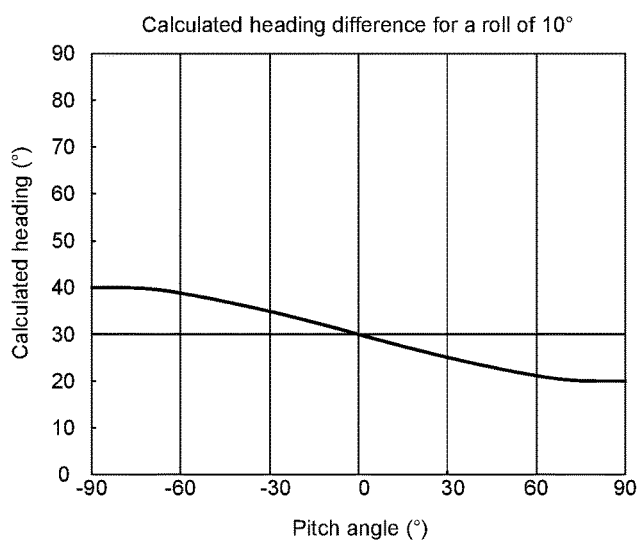
Figure 7C:
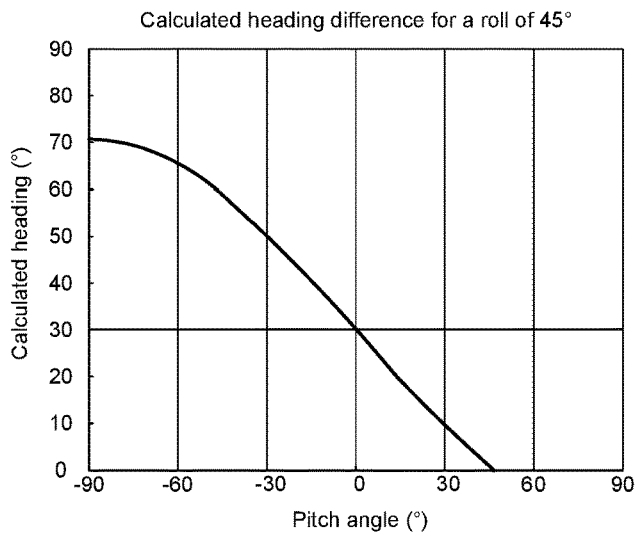

However, it will be noted that, for a relatively low roll (see FIG. 7b: 10° of roll), there is already a significant deviation of maximum of 10° within the range 0°-90°, in particular about 5° to 8° within the range 40°-60° which corresponds to the current values. Thus, preventing the predetermined threshold value from being within or corresponding to the usual pitch range is advantageous. FIG. 7c shows that as the roll angle increases, the difference in the result for the heading between the given order and the reverse order increases. Thus, for a roll angle of 45° and within a pitch range of 0° to 30°, the difference for the heading value can reach 20°.

The invention is not limited to the wearable device of the first embodiment described above. Indeed, the inversion of the order of the rotations not only allows to advantageously reduce the sensitivity to measurement noise during the prediction of two orientation angles but also to no longer suffer from the gimbal locking effect for many objects, such as a transport vehicle or a flying object. In general, the inversion of the order of the rotations according to the invention operates as a filter aiming at reducing the effect of the noise of the measurement of at least one vector of a terrestrial force field and at removing the gimbal lock when determining the orientation angles of an object relative to a terrestrial reference frame.

In a second embodiment, the navigation instrument allows to determine two angles of orientation of a system within the framework of spherical coordinates. The navigation instrument therefore allows to determine the two angles of orientation of the axis $\vec{1}_{r'}$ of the on-board reference frame on the basis of the measurement of a vector of the terrestrial magnetic field determined via a geolocation means.

The first embodiment proposes to first calculate the roll and pitch angles according to the measurement, in a reference frame linked to the navigation instrument, of a gravitational field vector $\vec{g'}_{mes}$, then the yaw angle from the measurement in the same on-board reference frame of a vector of the terrestrial magnetic field $\vec{B'}_{mes}$. This order can be reversed with a first step of calculating the yaw and roll angle from a measurement, still in a reference frame linked to the navigation instrument, of a vector of the terrestrial magnetic field $\vec{B'}_{mes}$, then the pitch angle from the measurement, in this on-board reference frame, of a terrestrial gravitational field vector $\vec{g'}_{mes}$. This example shows that the choice of the axes of the considered reference frames as well as the given order of the rotations is arbitrary.

The invention claimed is:

1. A navigation instrument (4) comprising:
    a first sensor (6) configured to measure three components of a first vector, called first measured vector, of a first terrestrial force field ($\vec{g'}_{mes}$; $\vec{B'}_{mes}$) in a reference frame ($\vec{1}_{x'}$; $\vec{1}_{y'}$; $\vec{1}_{z'}$) linked to said navigation instrument, called on-board reference frame, and generate first output signals which are representative of said three components ($g'_{x,mes}$, $g'_{y,mes}$, $g'_{z,mes}$; $B'_{x,mes}$, $B'_{y,mes}$, $B'_{z,mes}$), the on-board reference frame defining a first reference axis of rotation $\vec{1}_{x'}$ and a second reference axis of rotation $\vec{1}_{y'}$
    an orientation angle ($\varphi$, $\theta$, $\psi$) calculation unit (8) of the navigation instrument, said calculation unit being connected to said first sensor (6) to receive said first output signals and being configured to determine a first orientation angle ($\varphi$) and a second orientation angle (e) of said on-board reference frame, and thus of the navigation instrument (4), with respect to a terrestrial reference frame ($\vec{1}_x$, $\vec{1}_y$, $\vec{1}_z$) other than the on-board reference frame, said first and second orientation angles being defined by two successive rotations that the first measured vector must undergo, around the first reference axis of rotation $\vec{1}_{x'}$ for the first orientation angle and the second reference axis of rotation $\vec{1}_{y'}$ for the second orientation angle, to align said first measured vector with a calculation vector having, in the on-board reference frame, three calculation components which are identical to the three components, in the terrestrial reference frame, of a first reference vector ($\vec{g'}_{ref}$; $\vec{B'}_{ref}$) which is predefined or predetermined in the terrestrial reference frame, wherein the terrestrial reference frame is linked to the earth;
    wherein the orientation angle calculation unit (8) is configured to determine the first and second orientation angles in a given order for said two successive rotations and also in reverse order; and wherein the calculation unit (8) is arranged to choose between said given order and said reverse order, to determine the first and second orientation angles, based on a comparison between a risk of error and a predetermined threshold, said risk of error quantifying a risk of instability of said calculation unit during the determination of the first and second orientation angles and being determined by the navigation instrument according to at least one of said first output signals, and
    wherein the navigation instrument is an electronic compass (4) which comprises an indicator (18) of magnetic North or geographic North and wherein the electronic compass (4) controls an angle of the indicator relative to the first reference axis of rotation, the angle depending on said first and second orientation angles.

2. The navigation instrument according to claim 1, wherein said risk of error is the norm of the projection of the first vector measured in a plane perpendicular to the first reference axis of rotation; and wherein the orientation angle calculation unit (8) is configured to first determine the first orientation angle, by performing among said two successive rotations firstly the rotation of the first vector measured around the first reference axis of rotation, when said risk of error is greater than said predetermined threshold.

3. The navigation instrument according to claim 2, wherein the value of the predetermined threshold is comprised between 0.15 and 0.45 of the norm of the first measured vector, preferably between 0.20 and 0.30 of the norm.

4. The navigation instrument according to claim 1, wherein said risk of error is the absolute value of the second orientation angle when the first orientation angle is determined before the second orientation angle; and wherein the orientation angle calculation unit (8) is configured to again determine the first and second orientation angles by first determining the second orientation angle, by firstly performing among said two successive rotations the rotation of the first measured vector around the second reference axis of rotation, when said risk of error is greater than said predetermined threshold; the calculation unit (8) then retaining the values of the first and second orientation angles determined again for the first and second orientation angles.

5. The navigation instrument according to claim 4, wherein the value of the predetermined threshold is comprised between 65° and 80°, preferably between 70° and 75°.

6. The navigation instrument according to claim 1, wherein a predefined axis of the terrestrial reference frame is aligned with the first reference vector, preferably the first reference vector being aligned with a vertical axis $\overrightarrow{1_z}$ of the terrestrial reference frame.

7. The navigation instrument according to claim 6, wherein the first measured vector is a vector of the terrestrial gravitational force field.

8. The navigation instrument according to claim 7, wherein the first measured vector is determined by means of an accelerometer (6) forming said first sensor.

9. The navigation instrument according to claim 1, wherein the first reference axis of rotation corresponds to an axis $\overrightarrow{1_{x'}}$ of the on-board reference frame and the second reference axis of rotation corresponds to an axis $\overrightarrow{1_{y'}}$ of the on-board reference frame, the first and second reference axes of rotation being perpendicular.

10. The navigation instrument according to claim 9, wherein said instrument includes a second sensor (10) configured to measure the three components of a second vector, called second measured vector, of a second terrestrial force field in the on-board reference frame, the second measured vector being non-collinear with the first measured vector, and to generate second output signals representative of the three components; and wherein the navigation instrument further comprises a unit (12) for determining a third angle of orientation of said on-board reference frame, and thus of the navigation instrument, relative to the terrestrial reference frame, the determination unit being connected to said second sensor (10) to receive said second output signals and being configured to determine the third orientation angle from said determined first and second orientation angles and the second output signals.

11. The navigation instrument according to claim 10, wherein said calculation unit (8) and said unit (12) for determining the third orientation angle are formed by one and the same electronic unit which itself forms a central electronic unit (14) of the navigation instrument.

12. The navigation instrument according to claim 10, wherein the third orientation angle is defined by a rotation that the second measured vector must undergo, after having been reoriented in the on-board reference frame by an application to the second measured vector of said first and second successive rotations, around a third reference axis of rotation of the on-board reference frame, perpendicular to the first and second reference axes of rotation, so that the second measured and reoriented vector, called second reoriented vector, is located in a first reference plane of the on-board reference frame comprising the first and third reference axes of rotation.

13. The navigation instrument according to claim 12, wherein the third orientation angle is determined by first applying to the second measured vector said first and second successive rotations, preferably in the order chosen between said given order and said reverse order to define the first and second orientation angles, so as to obtain the second reoriented vector, then by determining the angle between a projection, in a second reference plane comprising the first and second reference axes of rotation, of the second reoriented vector and the first reference axis of rotation.

14. The navigation instrument according to claim 13, wherein the electronic compass (4) is configured to control the indicator (18) so that the angle of the indicator relative to the first reference axis of rotation is equal to the opposite of the third orientation angle, preferably corrected, for the indication of the magnetic North, for deviation of the terrestrial magnetic field at the location of the navigation instrument and, for the indication of the geographic North, in addition for declination of the terrestrial magnetic field.

15. The navigation instrument according to claim 12, wherein the electronic compass (4) is configured to control the indicator (18) so that the angle of the indicator relative to the first reference axis of rotation is equal to the opposite of the third orientation angle, preferably corrected, for the indication of the magnetic North, for deviation of the terrestrial magnetic field at the location of the navigation instrument and, for the indication of the geographic North, in addition for declination of the terrestrial magnetic field.

16. The navigation instrument according to claim 10, wherein the second measured vector is a vector of the terrestrial magnetic field, the second measured vector being determined by means of a magnetic sensor (10) forming said second sensor.

17. The navigation instrument according to claim 10, wherein the third orientation angle is considered as a heading of the instrument.

18. The navigation instrument according to claim 17, wherein the instrument comprises a device (20) for displaying data indicating the true heading, said calculation unit (8) being configured to determine the true heading according to said heading, of a first parameter quantifying the declination of the terrestrial magnetic field and a second parameter quantifying the deviation of the terrestrial magnetic field at the location where the navigation instrument is located.

19. The navigation instrument according to claim 1, wherein the first measured vector is a vector of the terrestrial magnetic field, the first measured vector being determined by means of a magnetic sensor (10) forming said first sensor.

20. The navigation instrument according to claim 19, wherein said three components are predetermined from data originating from a location device of the navigation instrument, in particular of the GPS type.

21. The navigation instrument according to claim 10, wherein the first measured vector is a vector of the terrestrial magnetic field, the first measured vector being determined by means of a magnetic sensor (10) forming said first sensor; and wherein the second measured vector is a vector of the terrestrial gravitational force field.

22. The navigation instrument according to claim 21, wherein the second measured vector is determined by means of an accelerometer (6) which forms said second sensor.

23. The navigation instrument according to claim 10, wherein the electronic compass (4) is configured to control the indicator (18) so that the angle of the indicator relative to the first reference axis of rotation is equal to the opposite of the third orientation angle, preferably corrected, for the indication of the magnetic North, for deviation of the terrestrial magnetic field at the location of the navigation instrument and, for the indication of the geographic North, in addition for declination of the terrestrial magnetic field.

24. A wearable device (2) comprising a wristband and the navigation instrument according to claim 1, wherein said wearable device (2) is wearable by the wristband.

25. The wearable device according to claim 24, wherein the device, in particular a wristwatch (2), is wearable on the wrist of a user; and wherein the first reference axis of rotation $\overline{1_{x'}}$ corresponds to the 6-12 o'clock axis and the second reference axis of rotation $\overline{1_{y'}}$ corresponds to the 9-3 o'clock axis of the device wearable on the wrist.

\* \* \* \* \*